(12) United States Patent
Carton

(10) Patent No.: US 10,890,352 B2
(45) Date of Patent: Jan. 12, 2021

(54) AIR HANDLING UNIT

(71) Applicant: Carrier Corporation, Palm Beach Gardens, FL (US)

(72) Inventor: Thomas Carton, Eloise (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 213 days.

(21) Appl. No.: 16/082,842

(22) PCT Filed: Mar. 10, 2016

(86) PCT No.: PCT/IB2016/000437
§ 371 (c)(1),
(2) Date: Sep. 6, 2018

(87) PCT Pub. No.: WO2017/153801
PCT Pub. Date: Sep. 14, 2017

(65) Prior Publication Data
US 2019/0093917 A1    Mar. 28, 2019

(51) Int. Cl.
*B01D 46/00* (2006.01)
*F24F 13/20* (2006.01)
(Continued)

(52) U.S. Cl.
CPC .......... *F24F 13/20* (2013.01); *B01D 46/0005* (2013.01); *B01D 46/0013* (2013.01);
(Continued)

(58) Field of Classification Search
CPC ........................ B01D 46/0005; B01D 46/0013
(Continued)

(56) References Cited

U.S. PATENT DOCUMENTS 1,521,575 A    12/1924   Hans
3,630,008 A    12/1971   Revell et al.
(Continued)

FOREIGN PATENT DOCUMENTS

DE    2447543 A1    4/1975
EP    1376023 A1    1/2004
(Continued)

OTHER PUBLICATIONS

Camfil, "AHUs & Air Filters: Better Together", available at: https://www.camfil.com/FileArchive/_30_Product_Support_Material_CamTab/Promotional%20Brochures/Hardware%20Brochure.pdf, accessed Sep. 6, 2018, 8 pages.
(Continued)

*Primary Examiner* — Robert A Hopkins
(74) *Attorney, Agent, or Firm* — Cantor Colburn LLP

(57) ABSTRACT

This air handling unit (1) comprises a structural frame (3, 5), and air handling components (15) enclosed within a housing (7), at least one of said components (15) having a rectangular shape arranged orthogonally to an air flow direction (F1, F2), and mounted by its edges (151, 153) on the structural frame. The at least one of the components (15) is mounted by one of its edges (151) on at least one movable rail (17) which is mounted in a sliding manner in a stationary rail (19) integral with the structural frame (3, 5) or the housing (7), the movable rail (17) being extractable with respect to the stationary rail (19) out of the housing (7) so that the component (15) can be extracted from the air handling unit (1).

14 Claims, 9 Drawing Sheets

(51) Int. Cl.
*F24F 13/28* (2006.01)
*F24F 3/044* (2006.01)
*F24F 3/16* (2006.01)
*F24F 13/30* (2006.01)

(52) U.S. Cl.
CPC .............. *F24F 3/044* (2013.01); *F24F 3/161* (2013.01); *F24F 13/28* (2013.01); *F24F 13/30* (2013.01); *F24F 2013/205* (2013.01); *F24F 2221/36* (2013.01)

(58) Field of Classification Search
USPC .......................................................... 55/481
See application file for complete search history.

(56) References Cited

U.S. PATENT DOCUMENTS

| | | |
|---|---|---|
| 3,679,274 A | 7/1972 | Nance |
| 5,582,026 A | 12/1996 | Barto, Sr. |
| 5,665,145 A | 9/1997 | Goodman et al. |
| 5,924,300 A | 7/1999 | Fromm et al. |
| 6,962,397 B2 | 11/2005 | Dobler et al. |
| 7,258,196 B2 | 8/2007 | Radatus et al. |
| 7,332,012 B2 | 2/2008 | O'Connor et al. |
| 7,581,619 B1 | 9/2009 | Storm |
| 8,211,198 B2 | 7/2012 | Weber et al. |
| 8,944,397 B2 | 2/2015 | Brown et al. |
| 2008/0218047 A1 | 9/2008 | Buczynsk et al. |
| 2011/0232861 A1 | 9/2011 | Stewart et al. |

FOREIGN PATENT DOCUMENTS

| | | |
|---|---|---|
| EP | 2108897 A1 | 10/2009 |
| EP | 2520869 A1 | 11/2012 |
| EP | 2382425 B1 | 8/2013 |
| WO | 0150072 A1 | 7/2001 |
| WO | 2010085197 A2 | 7/2010 |

OTHER PUBLICATIONS

International Search Report and Written Opinion for application PCT/IB2016/000437, dated Nov. 8, 2016, 8 pages.

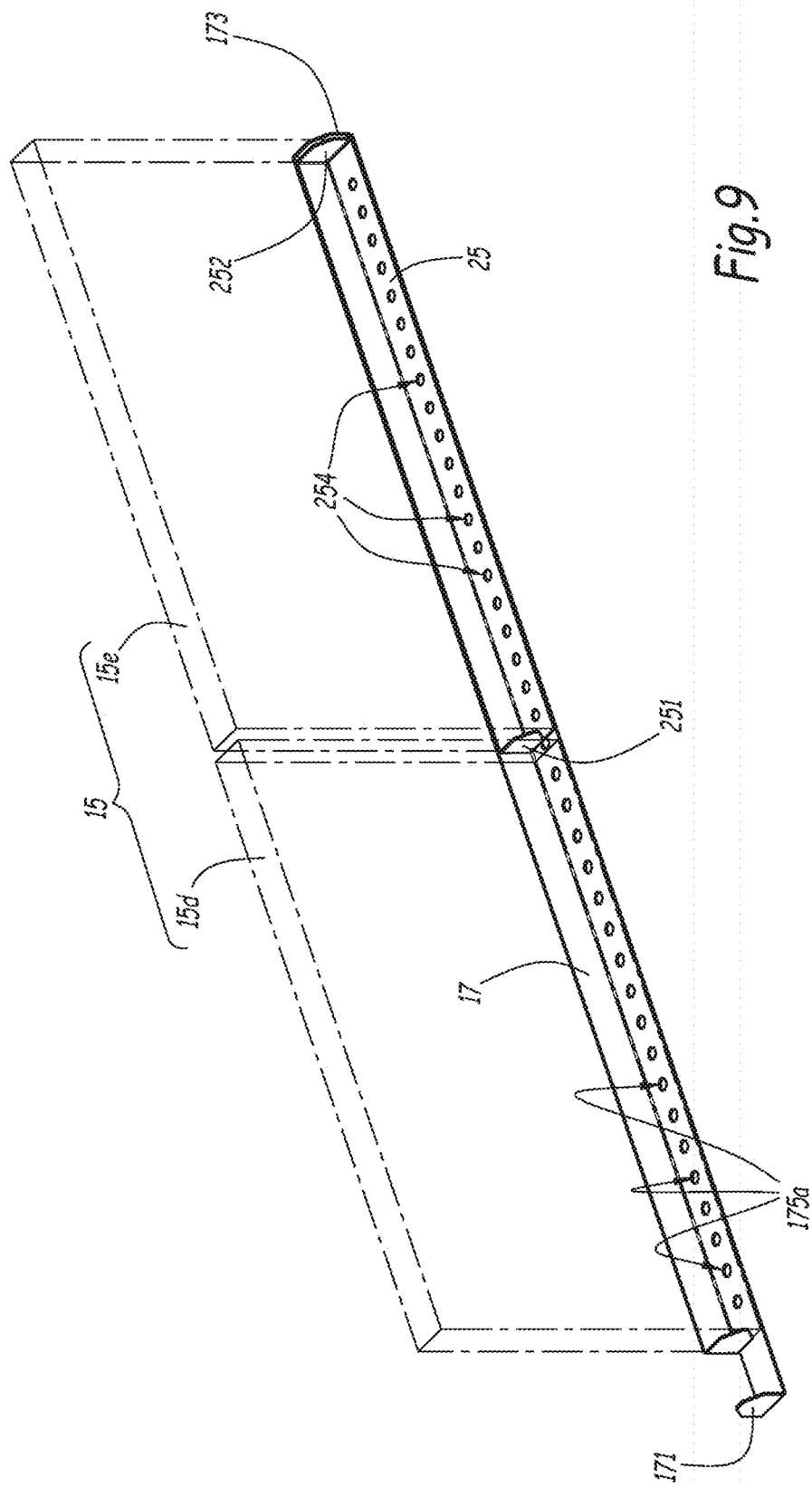

AIR HANDLING UNIT

The invention concerns an air handling unit.

It is known to implement air handling units on buildings, especially office buildings or supermarkets, for treating the air contained inside the building. Such air handling units usually have inlet and outlet openings, for the air to be circulated through the unit, and a plurality of components, each relative to a function for treating the air, such as circulating, filtering, depolluting, humidifying, drying, heating, cooling, or the like. These components are enclosed inside a structural frame, supporting a housing made of flat insulating panels, forming a protective thermal barrier of the air handling unit. Each panel comprises an insulating core material, for example a glass wool, interposed between two metallic walls.

Some components of the air handling unit, such as filters or drop separators, are usually formed of a rectangular shape arranged orthogonally to the direction of the air flow circulating through the air handling unit. The air handling unit generally comprises two air flows oriented horizontally, the components being vertical and fixed by their edges on the structural frame of the air handling unit. It is known, for example from U.S. Pat. No. 3,630,008, to mount the components in a sliding manner on the structural frame of the air handling unit. The components are subject to technical operations made by operators, which have to dismount and extract the components from the air handling unit. The operators access the components through openings provided in the insulating panels of the air handling unit, and often have to lean inside the air handling unit to unfasten and extract the furthermost components. This is physically dangerous and tiring, the efficiency of these operations being thus unsatisfying.

The aim of the invention is to provide a new air handling unit, which allows less dangerous and more efficient extraction operations of the components of the air handling unit.

To this end, the invention concerns an air handling unit comprising a structural frame, the air handling unit comprising air handling components enclosed within a housing, at least one of said components having a rectangular shape arranged orthogonally to an air flow direction, and mounted by its edges on the structural frame. This air handling unit is characterized in that the at least one of the components is mounted by one of its edges on at least one movable rail which is mounted in a sliding manner in a stationary rail integral with the structural frame or the housing, the movable rail being extractable with respect to the stationary rail out of the housing so that the component can be extracted from the air handling unit.

Thanks to the invention, an operator can easily extract one or more components of the air handling unit, without having to lean inside the air handling unit and in a faster way than in the prior art.

According to further aspects of the invention, such an air handling unit may incorporate one or several of the following features:

The movable rail comprises, on an end located on the side of an opening provided in the housing, a handle for drawing the movable rail out of the stationary rail.

The movable rail comprises, on an end located on the opposite side from an opening provided in the housing, a hooked element in which the component is inserted so that it is integral in movement with the movable rail.

The movable rail is L-shaped.

One or each of the movable rail and the stationary rail comprises a face provided with holes through which condensing liquids are evacuated towards a liquid recovery volume of the air handling unit.

The component comprises several sections assembled along the length of the movable rail.

Supplementary movable rails are mounted in the movable rail for extracting the sections of the component.

The component is mounted in a sliding manner in the movable rail.

The component is a filter.

The component is a drop separator.

Several components of the air handling unit are mounted on movable rails.

An edge of the component, which is opposed to the edge that is mounted in the movable rail, is inserted in a guiding rail fixed on the structural frame or on the housing.

An edge of the component, which is opposed to the edge that is mounted in the movable rail, is mounted in a second movable rail that is itself mounted in a fixed rail attached to the structural frame or to the housing.

The movable rail and the stationary rail are oriented perpendicular to a panel of the housing and facing an opening provided in the housing so that the movable rail can be extracted with respect to the stationary rail out of the housing through the opening provided in the housing.

The movable and stationary rails are provided on horizontal panels of the housing, and the opening in the housing is provided on a vertical panel of the housing.

The invention will now be explained with reference to the annexed drawings, as an illustrative example. In the annexed drawings:

FIG. 9 is a perspective view of a movable rail of an air handling unit according to a second embodiment of the invention.

Figure 1:
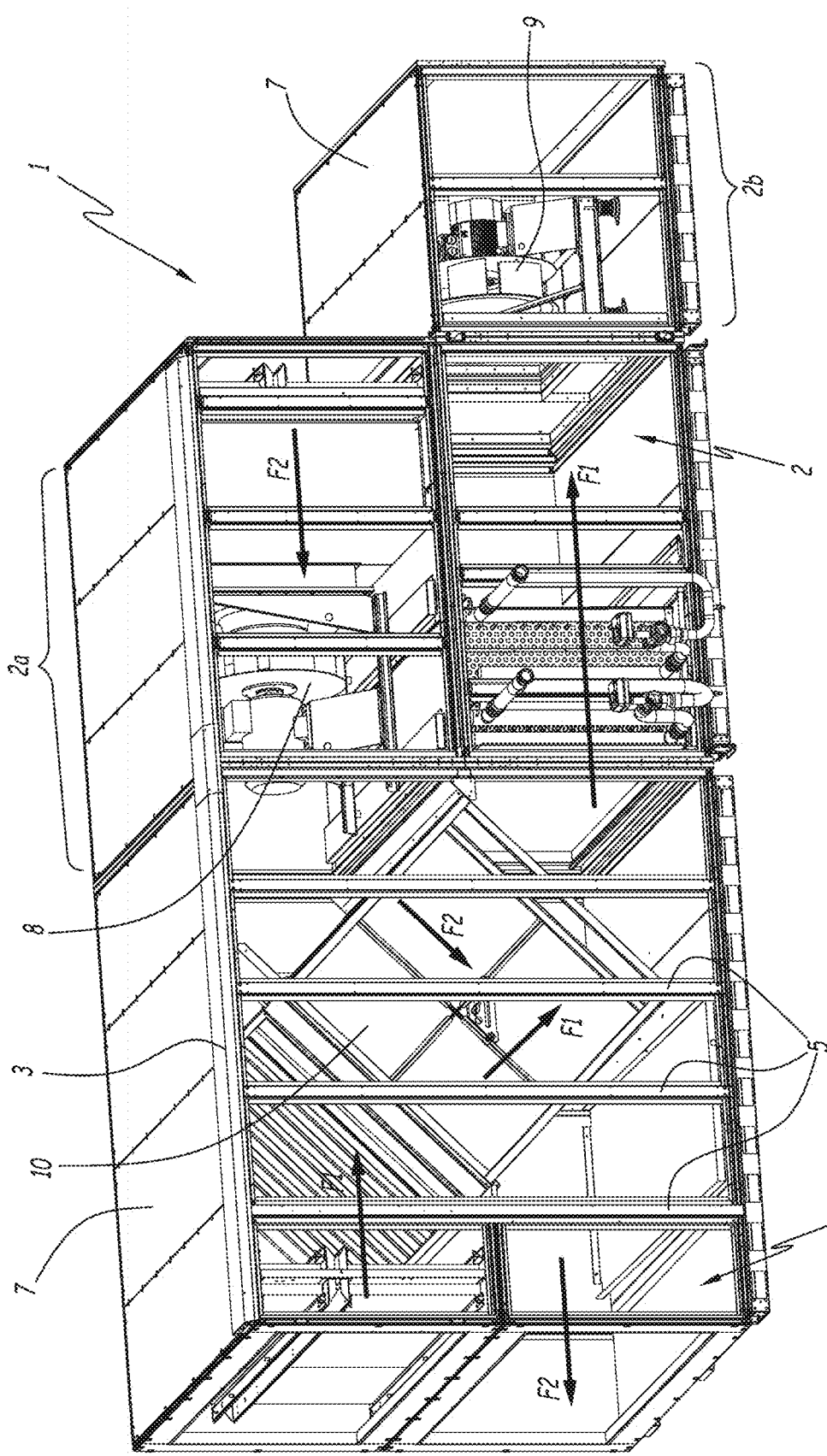
FIG. 1 is a perspective view of an air handling unit according to the invention.

FIG. 1 shows an air handling unit 1 which comprises a plurality of modules 2 and a plurality of components. Each module 2 comprises a structural frame formed by horizontal bars 3 and vertical bars 5. The horizontal and verticals bars 3 and 5 support a housing made of flat insulating panels 7, some of these panels 7 being represented on FIG. 1 on top surfaces of the air handling unit 1.

Each module 2 of the air handling unit 1 includes at least one component, of which some of them are represented in FIG. 1. Two ventilators 8 and 9 equipped with motors are shown in modules 2a and 2b.

Some components of the air handling unit 1, such as for example filters, or separators, have a rectangular shape arranged orthogonally to an air flow direction and are mounted by their edges on the structural frame. As represented on the example, which shows the general arrangement of most air handling units, the air flow direction, represented by arrows F1 and F2 on FIG. 1, is horizontal, except for a double-flux heat exchanger 10. The components are oriented vertically, forming parallel planes perpendicular to the arrows F1 and F2.

Figure 2:
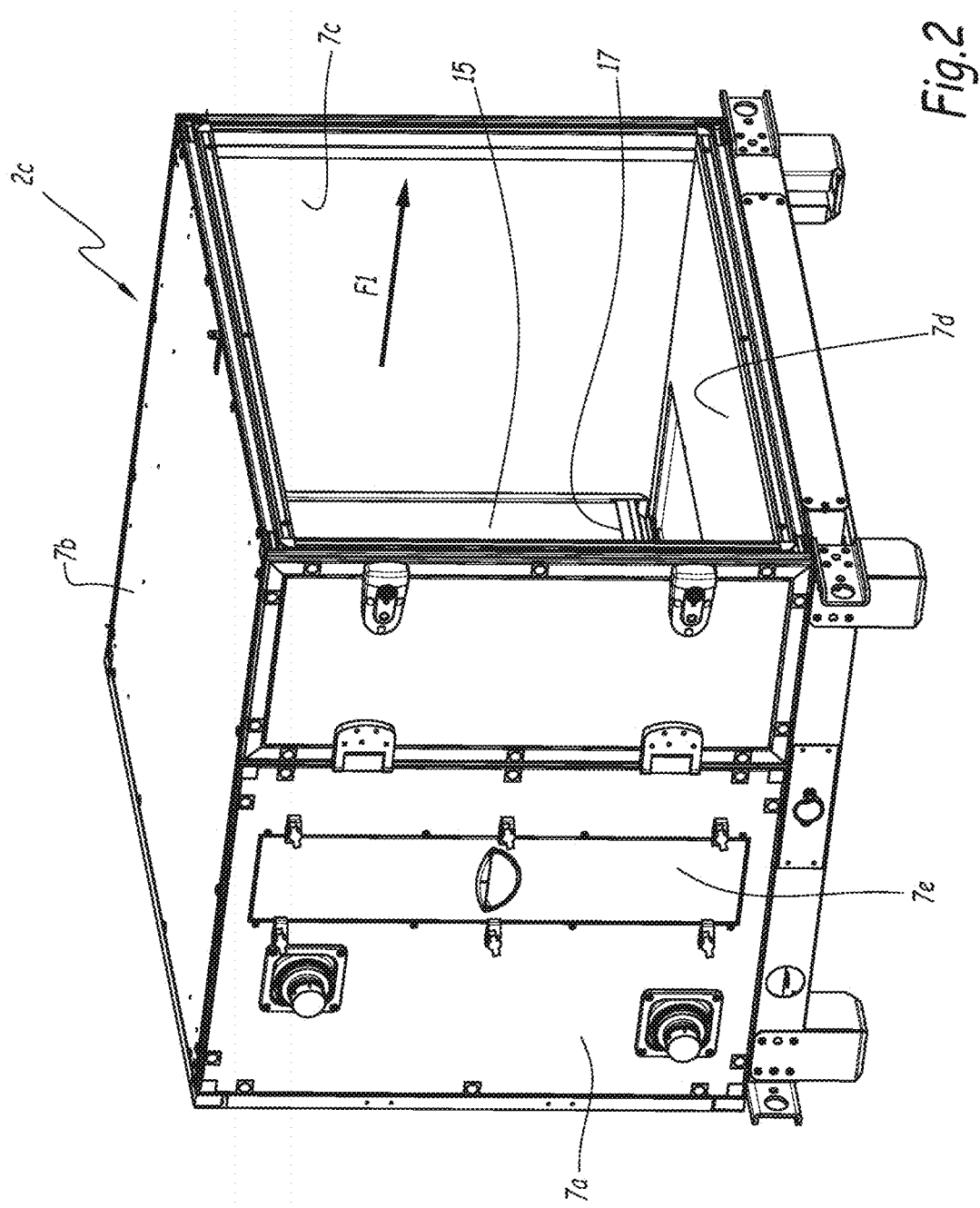
FIG. 2 is a perspective view of a module of the air handling unit of FIG. 1.

FIGS. 2 to 7 represent a module 2c of the air handling unit 1, in various configurations. Module 2c comprises a front insulating panel 7a, a top insulating panel 7b, a rear insulating panel 7c and a bottom insulating panel 7d. The front panel 7a comprises an opening 7a1 and a closing panel 7e adapted to fit in the opening 7a1 so as to close the housing of the air handling unit 1, as shown in FIG. 2. In FIGS. 3 to 7, the closing panel 7e is dismounted.

As shown in FIG. 2, a portion of a component 15 of the air handling unit 1 is visible. The component 15 may be, for example, a filter or a drop separator. The component 15 is oriented perpendicularly to the flow direction, represented by arrow F1, which is oriented towards the right side of FIG. 2. The component 15 is mounted by one of its edges, namely an inferior edge 151, on a movable rail 17, which is mounted in a sliding manner in a stationary rail 19 which is integral to the structural frame and to the housing. The stationary rail 19 is attached to the structural frame and/or to the housing using means which are not shown.

Figure 3:
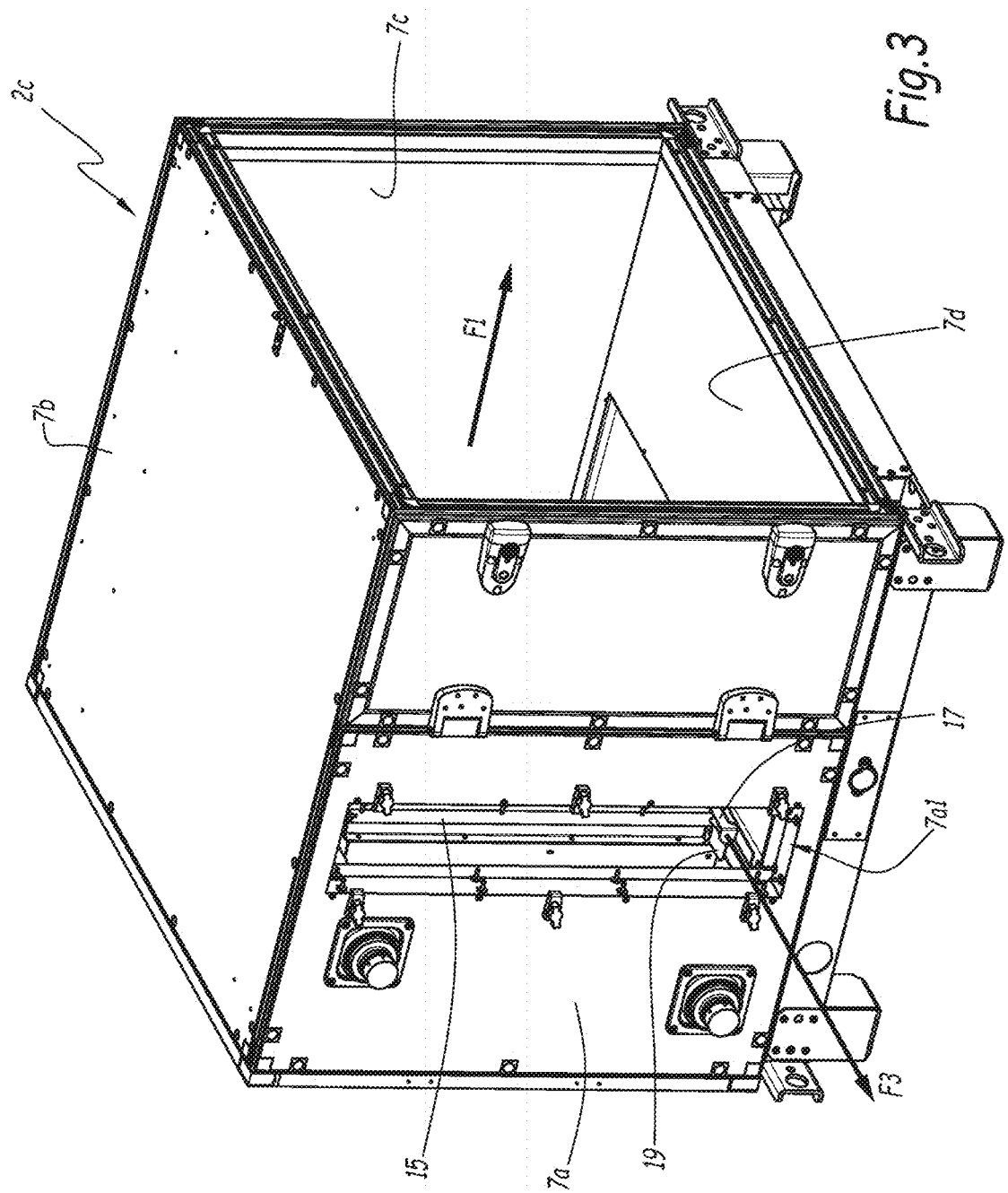
FIGS. 3 to 7 are perspective views similar to FIG. 2, for successive extraction steps of a component of the air handling unit.
Figure 4:
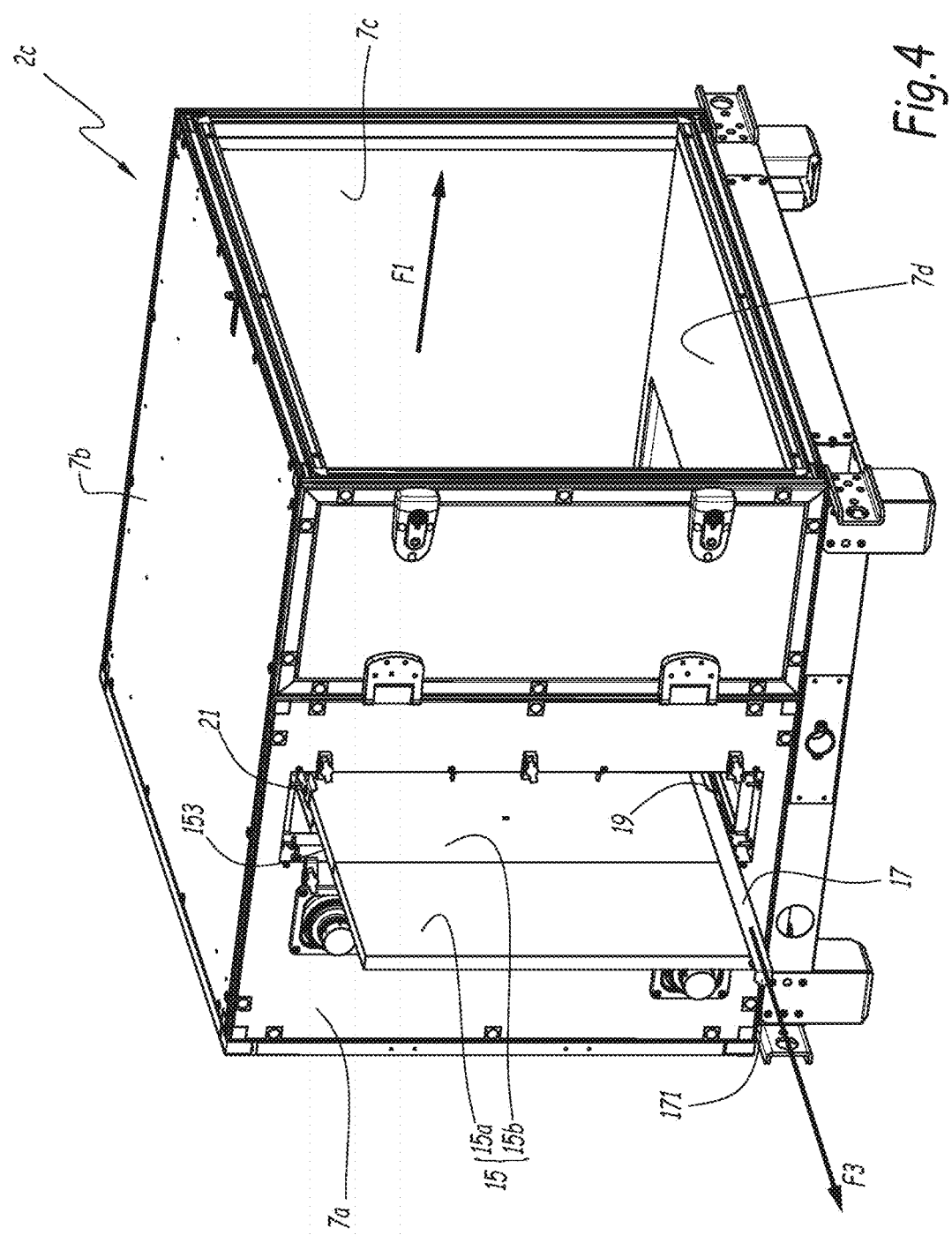

The movable rail 17 is translatable with respect to the stationary rail 19 out of the housing so that the component 15 can be extracted from the movable rail 17 and from the air handling unit 1, as shown by arrow F3 on FIGS. 3 and 4.

As shown in FIG. 4, the movable rail 17 has been partially extracted from the stationary rail 19. In this configuration, a portion of the component 15 can be extracted from the movable rail 17 and from the air handling unit 1.

As an optional embodiment, the component 15 is formed of at least two sections assembled along the length of the movable rail 17. In the represented example, the component 15 comprises three sections 15a, 15b and 15c, the section 15a being the one located on the side of the front panel 7a, the section 15c being the one located on the side of the rear panel 7c, and the section 15b being located between the sections 15a and 15c. This allows extracting the component 15 without having to completely extract the movable rail 17 with respect to the stationary rail 19, as the sections 15a to 15c can be translated along the movable rail 17.

Figure 5:
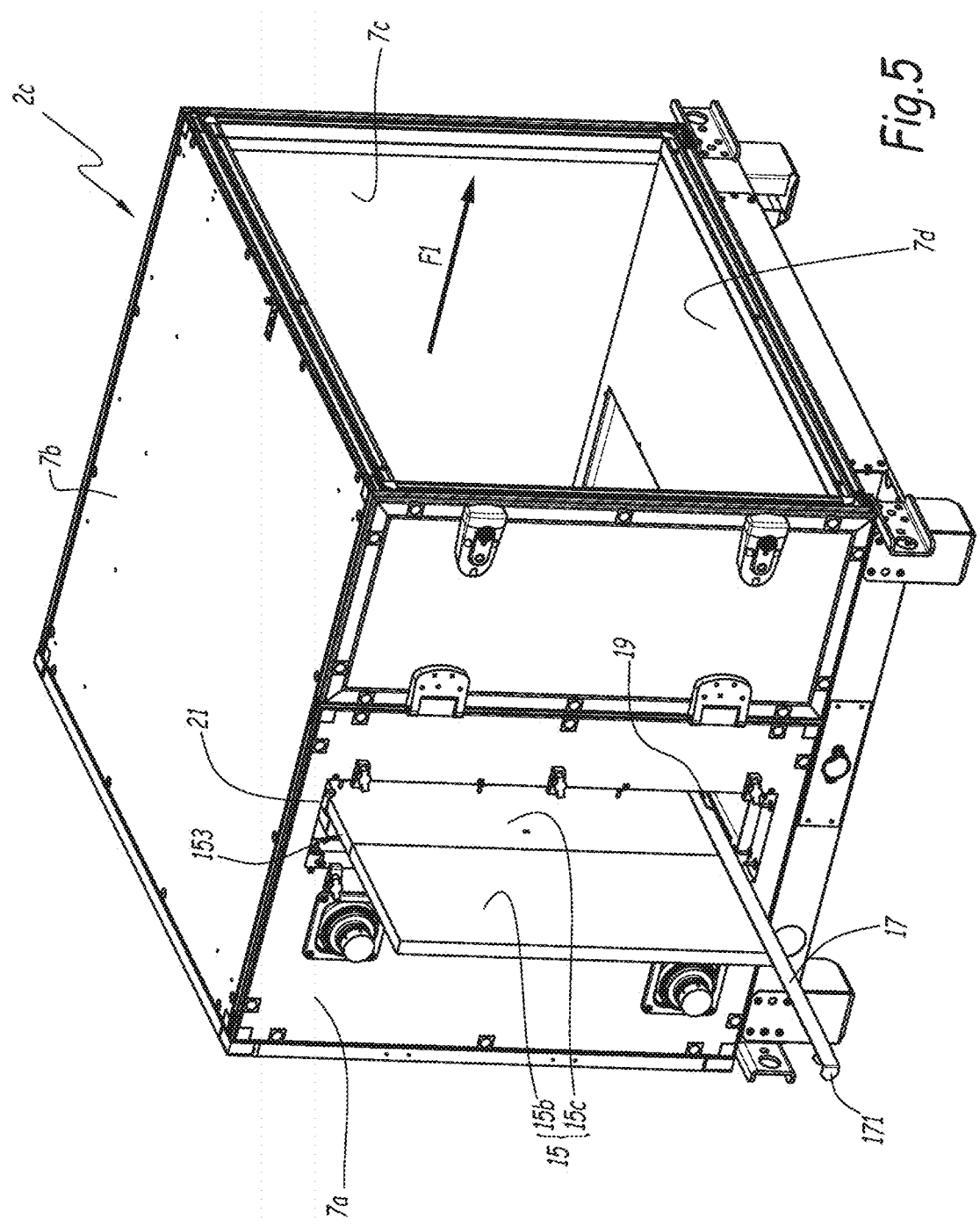

As shown in FIG. 5, the section 15a has been extracted from the movable rail 17, and the movable rail 17 has been further extracted from the stationary rail 19. The middle section 15b is therefore ready to be extracted from the movable rail 17.

Figure 6:
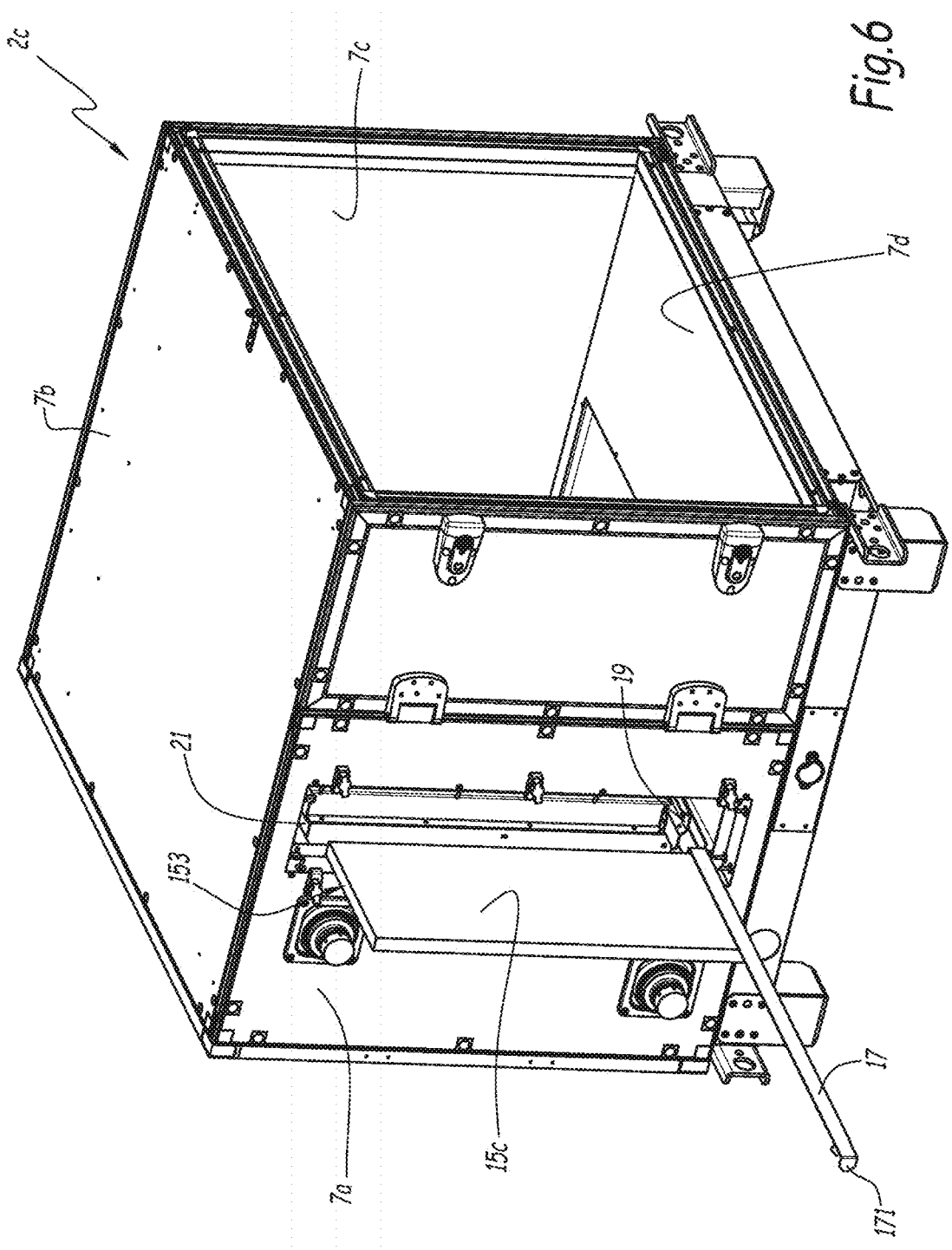
Figure 7:
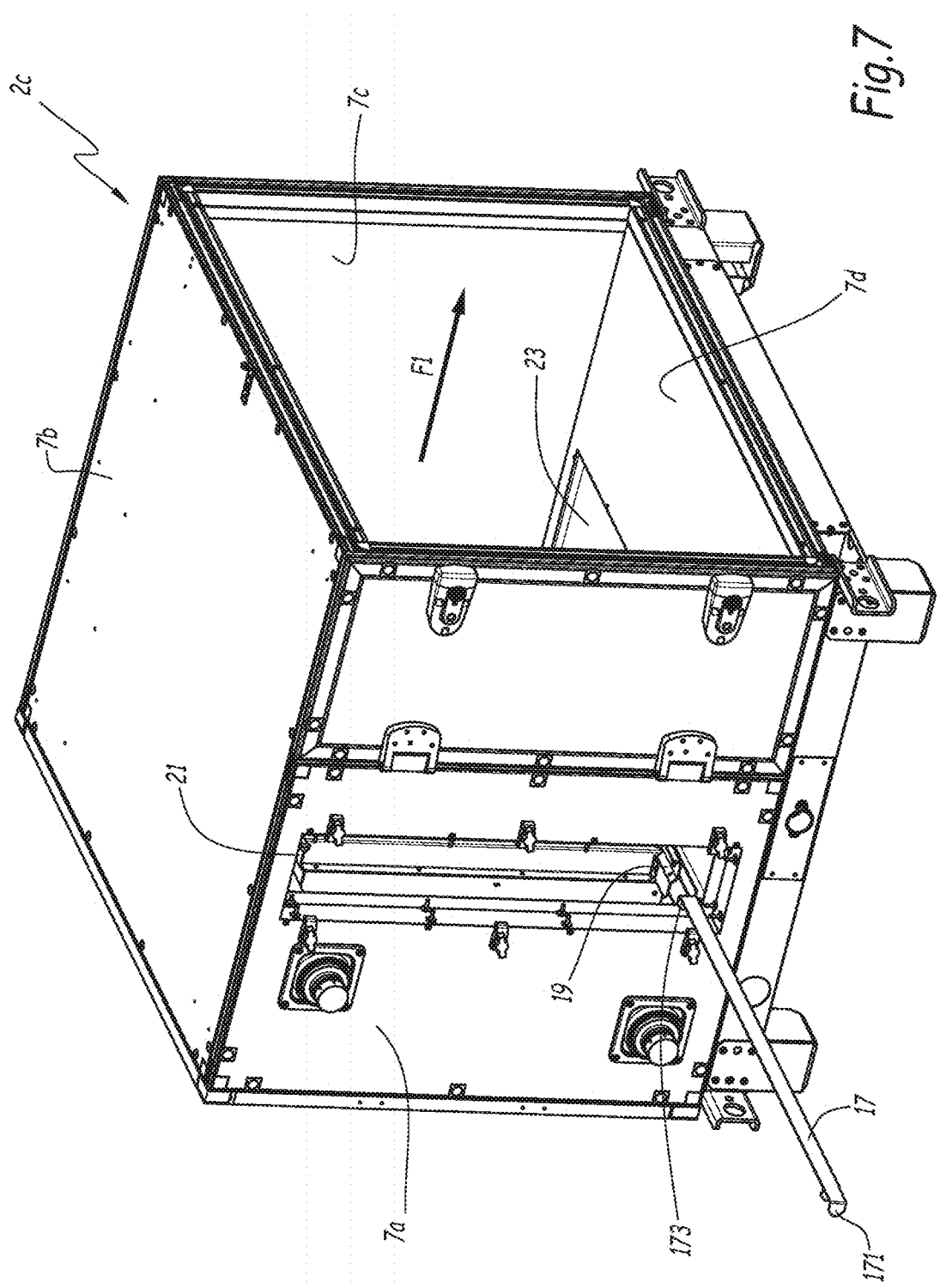

As shown in FIG. 6, the movable rail 17 has been totally extracted from the stationary rail 19. The rear section 15c can therefore be extracted from the movable rail 17. In FIG. 7, the rear section 15c has been extracted from the movable rail 17.

As an optional feature, the sections 15a to 15c of the component 15 may be mounted in a sliding manner in the movable rail 17. This permits to extract the sections 15a to 15c even if there is not enough room to completely extract the movable rail 17 from the stationary rail 19. For instance, when the movable rail 17 is in the position of FIG. 4, only the first section 15a can be extracted. Once extracted, the first section 15a leaves space for sliding the middle section 15b along arrow F3 towards the exterior side of the housing, so that the middle section 15b can also be extracted, without having to further extract the movable rail 17. Then the rear section 15c can be slid on the movable rail 17 and also extracted. As the movable rail 17 has been first extracted from the inside of the unit 1 by at least the length of the first section 15a, the operator does not need to lean inside the unit 1, and only has to pull the rear section 15c with his arm by the space left by the first and middle sections 15a and 15b.

Figure 8:
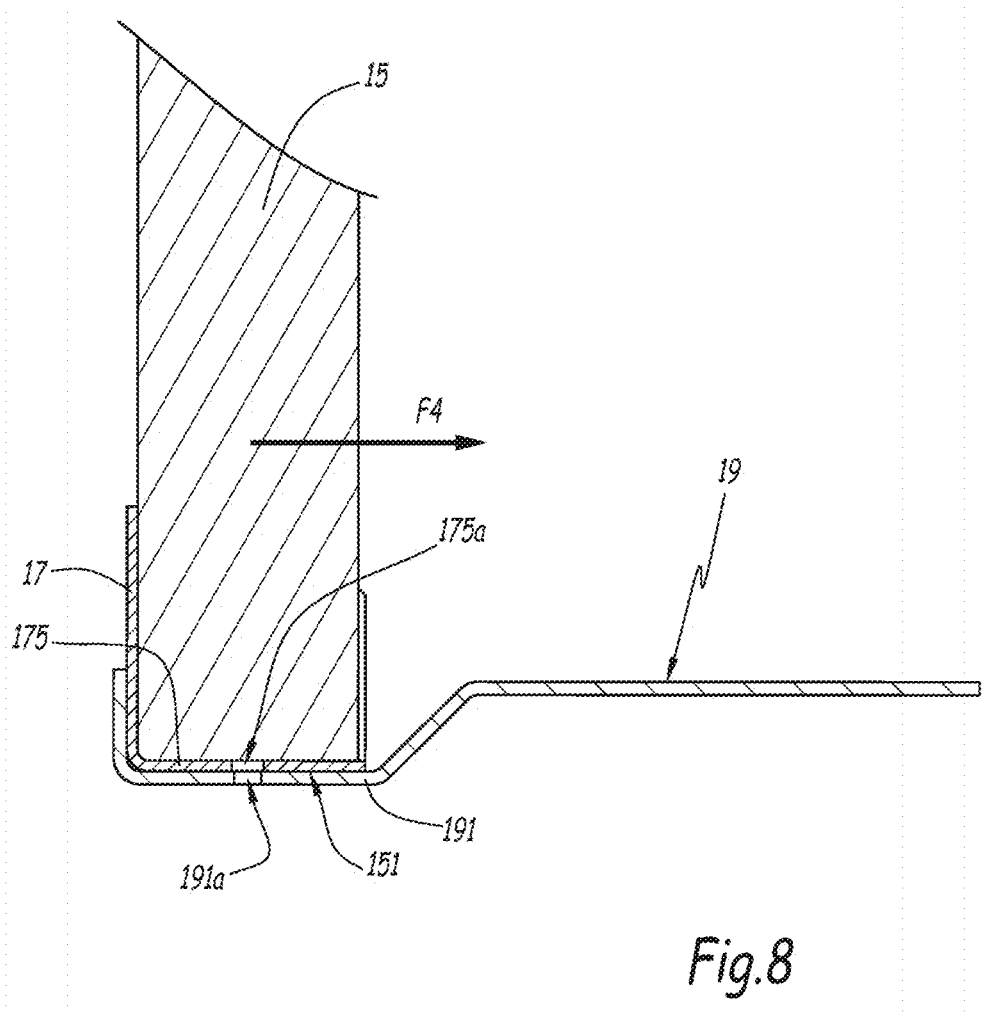
FIG. 8 is a sectional view of a component, a movable rail and a stationary rail of the air handling unit.

As shown in FIG. 8, which shows the component 15, the movable rail 17 and the stationary rail 19, the movable rail 17 is L-shaped so that the component 15 can be extracted laterally with respect to the longitudinal direction of the movable rail 17, as represented by arrow F4.

As shown in FIG. 8, the movable rail 17 and the stationary rail 19 respectively comprise faces 175 and 191 located under the component 15. The faces 175 and 191 are each provided with at least one hole 175a and 191a through which condensing liquids can be evacuated towards a bottom liquid recover volume 23 of the air handling unit 1. The movable rail 17 and the stationary rail 19 may comprise several holes 175a and 191a distributed along the length of the movable rail 17 and the stationary rail 19. The liquid recover volume 23 can for instance be provided in bottom panel 7d. The holes 175a are also visible on FIG. 9.

The movable rail 17 comprises, on its end located on the side of the front panel 7a, a handle 171 with which the movable rail 17 can be drawn out of the stationary rail 19 by an operator.

The movable rail 17 comprises, on its end located on the opposite side from the opening 7a1, on the side of the rear panel 7c, a hooked element 173 represented on FIGS. 7 and 9. The component 15 is inserted in the hooked portion 173 so that the component 15 is integral in movement with the movable rail 17 when the movable rail 17 is extracted towards the outside of the air handling unit 1.

The air handling unit 1 comprises a guiding rail 21 fixed on the structural frame, and in which an edge of the component 15, namely a superior edge 153, is mounted so that the extraction of the component 15 follows a straight direction.

According to an optional second embodiment of the invention represented on FIG. 9, supplementary movable rails can be mounted in the movable rail 17 for extracting supplementary sections of the component 15. FIG. 9 shows the movable rail 17 and a second movable rail 25, which is movable in translation with respect to the movable rail 17. The movable rail 25 comprises a handle 251 and a hooked portion 252. The movable rail 25 may also comprise holes 254, similar to the holes 175a, for allowing recovery of condensing fluids.

In the example of FIG. 9, the component 15 comprises two sections 15d and 15e. The section 15e of the component 15 is mounted in the movable rail 25, while the section 15d of the component 15 is mounted in the portion of the movable rail 17 that is not occupied by the movable rail 25. When the section 15d is extracted, the movable rail 25 can be with respect to the movable rail 17 so that the section 15e can be easily extracted. Although only one rail 25 is represented on FIG. 9, further movable rails can be implemented so as to allow extraction of further component sections.

Several components of the air handling unit 1 can be mounted on movable rails similar to the movable rail 17.

According to a non-shown embodiment of the invention, the superior edge 153 of the component 15 which is opposed to the inferior edge 151 that is mounted in the movable rail 17, can be mounted in a second movable rail that is itself mounted in a second stationary rail, similar to the stationary rail 19 provided on the side of the top panel 7b. This second movable rail can be attached to a top element of the structural frame or to the top panel 7b.

According to another non-shown embodiment, the extraction of the movable rail 17 with respect to the stationary rail 19 may be obtained using sliding means such as balls, rollers, or the like. As well, the translation of the components 15 with respect to the movable rail 17 may also be obtained using sliding means such as balls, rollers, or the like.

The technical features of the variants described herebelow can be combined to form new embodiments of the invention.

The invention claimed is:

1. Air handling unit comprising a structural frame, the air handling unit comprising air handling components enclosed within a housing, at least one of said components having a rectangular shape arranged orthogonally to an air flow direction (F1, F2), and mounted by its edges on the structural frame, wherein the at least one of the components is mounted by one of its edges on a movable rail, the movable rail mounted in a sliding manner in a stationary rail integral with the structural frame or the housing, the movable rail being extractable with respect to the stationary rail out of the housing so that the component can be extracted from the air handling unit, wherein the moveable rail is mounted to a first edge of the component, wherein a second edge of the component opposite the first edge of the component lacks a moveable rail.

2. Air handling unit according to claim 1, wherein the movable rail comprises, on an end located on the side of an opening provided in the housing, a handle for drawing the movable rail out of the stationary rail.

3. Air handling unit according to claim 1, wherein the movable rail comprises, on an end located on the opposite side from an opening provided in the housing, a hooked element in which the component is inserted so that it is integral in movement with the movable rail.

4. Air handling unit according to claim 1, wherein the movable rail is L-shaped.

5. Air handling unit according to claim 1, wherein the component comprises several sections assembled along the length of the movable rail.

6. Air handling unit according to claim 1, wherein the component is mounted in a sliding manner in the movable rail.

7. Air handling unit according to claim 1, wherein the component is a filter.

8. Air handling unit according to claim 1, wherein the component is a drop separator.

9. Air handling unit according to claim 1, wherein several components of the air handling unit are mounted on movable rails.

10. Air handling unit according to claim 1, wherein the second edge of the component, which is opposed to the first edge that is mounted in the movable rail, is inserted in a guiding rail fixed on the structural frame or on the housing.

11. Air handling unit according to claim 1, wherein the movable rail and the stationary rail are oriented perpendicular to a panel of the housing and facing an opening provided in the housing so that the movable rail can be extracted with respect to the stationary rail out of the housing through the opening provided in the housing.

12. Air handling unit according to claim 11, wherein the movable and stationary rails are provided on horizontal panels of the housing, and the opening in the housing is provided on a vertical panel of the housing.

13. Air handling unit comprising a structural frame, the air handling unit comprising air handling components enclosed within a housing, at least one of said components having a rectangular shape arranged orthogonally to an air flow direction (F1, F2), and mounted by its edges on the structural frame, wherein the at least one of the components is mounted by one of its edges on a movable rail, the movable rail mounted in a sliding manner in a stationary rail integral with the structural frame or the housing, the movable rail being extractable with respect to the stationary rail out of the housing so that the component can be extracted from the air handling unit;

wherein one or each of the movable rail and the stationary rail comprises a face provided with holes through which condensing liquids are evacuated towards a liquid recovery volume of the air handling unit.

14. Air handling unit comprising a structural frame, the air handling unit comprising air handling components enclosed within a housing, at least one of said components having a rectangular shape arranged orthogonally to an air flow direction (F1, F2), and mounted by its edges on the structural frame, wherein the at least one of the components is mounted by one of its edges on a movable rail, the movable rail mounted in a sliding manner in a stationary rail integral with the structural frame or the housing, the movable rail being extractable with respect to the stationary rail out of the housing so that the component can be extracted from the air handling unit;

wherein the component comprises several sections assembled along the length of the movable rail;

wherein supplementary movable rails are mounted in the movable rail for extracting the sections of the component.

* * * * *